United States Patent [19]

Hodges et al.

[11] Patent Number: 4,485,801

[45] Date of Patent: Dec. 4, 1984

[54] COOKING UTENSILS

[76] Inventors: Wyndham Hodges, Highfields, Cwm La., Rogerstone, Gwent; Collin E. Symonds, 4 Ombersley Rd., Newport, Gwent, both of Wales

[21] Appl. No.: 545,346

[22] Filed: Oct. 25, 1983

[51] Int. Cl.³ .............................................. A47J 27/58
[52] U.S. Cl. .................................. 126/386; 220/367; 99/446
[58] Field of Search ............... 126/386, 385, 383, 384, 126/51; 220/4 A, 4 C, 428, 213, 367; 99/444, 446

[56] References Cited

U.S. PATENT DOCUMENTS

| 181,396 | 8/1876 | Bevin | 126/386 |
|---|---|---|---|
| 880,096 | 2/1908 | Regnell | 126/386 |
| 1,143,022 | 6/1915 | Barabas et al. | 126/386 |
| 1,422,156 | 7/1922 | Wever | 126/386 |
| 1,717,971 | 6/1929 | Guetzow | 126/386 |
| 3,857,381 | 12/1974 | Kato | 126/386 X |

FOREIGN PATENT DOCUMENTS

| 436019 | 8/1924 | Fed. Rep. of Germany | 126/383 |
|---|---|---|---|
| 138553 | 3/1930 | Netherlands | 126/386 |

*Primary Examiner*—Randall L. Green
*Attorney, Agent, or Firm*—Young & Thompson

[57] ABSTRACT

A saucepan of cast aluminium or moulded ceramics or glass has a trough around its rim to catch liquid boiling over. Small bore ducts lead down within the casting from the base of the trough into the main portion of the pan to return boiled-over liquid. The ducts trap bubbles in the boiling liquid to prevent upward flow. A vented lid may be provided to direct water condensate on its underside to drip into the trough, where it may again vaporize and escape via the vent. A basket can also be fitted within the main portion of the pan.

9 Claims, 3 Drawing Figures

COOKING UTENSILS

This invention relates to that described in application Ser. No. 411,039 filed Aug. 24, 1982, abandoned, and concerns cooking utensils, primarily pans for cooking in oil, such as chip pans. It is applicable to any container used for cooking, but for convenience reference will be made simply to saucepans.

The aim is to provide a defence against boiling over or spillage due, for example, to adding too many ingredients, or to adding ingredients with a high water content to very hot fat or oil. Apart from the mess and inconvenience there is the danger of fire when fat is spilt, and of scalding.

According to the present invention there is provided a cooking pan comprising an integrally formed structure having a base and a wall upstanding from the periphery of the base and dividing around the rim to form an overspill trough, there being small bore ducting formed within the thickness of the wall leading down from the base of the trough to open into the interior of the pan, said small bore ducting being entirely surrounded by said wall and having a length within said wall that is substantially greater than its width within said wall.

The pan may be of cast metal, preferably aluminium, but it is also envisaged that moulded ceramics or glass could prove equally effective.

Just two ducts at diametrically opposite positions have been found sufficient, but there could be just one or more than two. The ducts will generally be drilled after the casting or moulding is formed, and their length may very broadly be of the order of 8–25 mm, and their diameter in the range 2–7 mm. For use with fat or cooking oil, the range will generally be 8–20 mm length and 2–3 mm diameter, the latter being the more critical dimension, for reasons to be explained. The larger sizes may be more suitable for other liquids. The or each duct may be given a taper, being wider at the lower end than at the upper, to enhance the non-return valve effect described below.

The wall preferably divides with an inner portion continuing up from the single part and an outer portion projecting outwardly and then upwardly to a rim height greater than that of the inner portion. With this construction, at the junction of the inner and outer portions, the single part of the wall may be locally thickened externally in the form of circumferentially spaced fillets, the ducting being formed in a selection of such fillets.

The pan may be equipped with a lid. Preferably this will have a domed central portion which will clear the inner rim of the trough and an upwardly and outwardly inclined outer edge portion which will locate on the outer rim of the trough, these portions merging at an annular node overlying the trough. There will generally be venting means provided in the outer edge portion. This effectively removes water condensate as will be described.

A further possible item is a basket adapted to be suspended within the pan from the inner rim of the trough or to rest on the base. This may be used to hold a charge within the liquid fat, or it can make the pan into an effective steamer, holding the food suspended over a small reservoir of boiling water in the base of the pan.

The invention may be performed in various ways and a specific embodiment will now be described, by way of example, with reference to the accompanying drawings, in which.

Figure 1:
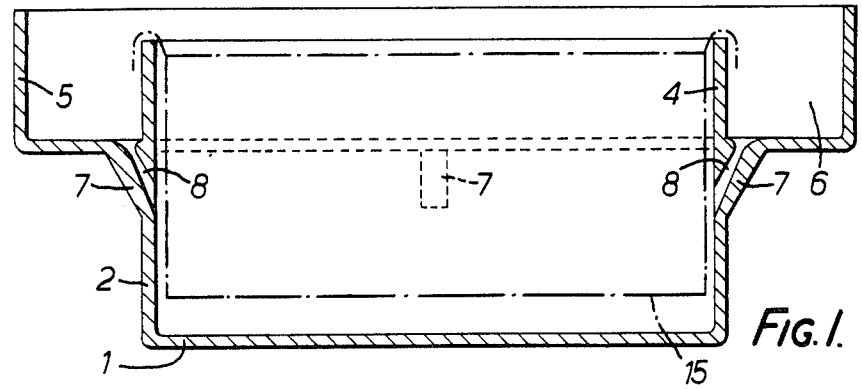
FIG. 1 is a cross-section of a saucepan.

The saucepan is of cast metal, preferably aluminium or of moulded ceramics or glass. It has a flat base 1 and a wall 2 with which is integrally formed a socket (not shown) for receiving a handle. At about its mid-height the wall 2 divides, continuing upwardly with an inner portion 4 and branching outwardly and then upwardly with an outer portion 5, thereby providing an annular trough 6 around the rim. The rim of the inner portion 4 is lower than that of the outer portion 5, and so liquid in the pan boiling over will spill into the relatively cooler trough 6 and stop boiling before it can escape the pan altogether. With reasonable capacity the trough 6 can accept as much liquid boiling over as the pan can produce without letting it spill further out over the outer rim, and hence onto the cooker.

The trough is also a safety measure against other spills, occurring when too many ingredients are poured into the pan, for example.

At two diametrically opposite points there are external fillets 7, integrally formed in the casting, in the angle between the trough base and the single wall. The sectional plane of FIG. 1 is taken through these fillets. They are drilled through, at as steep an angle as possible, to form ducts 8 which lead from the base of the trough 6 downwardly and inwardly back into the main portion of the pan below the trough. There are also two other similar fillets, equidistant between the fillets 7 but without drilled ducts, one of these being shown in ghost in FIG. 1. These fillets have a reinforcing function as well as two of them (in this example) providing suitable thickening to enable ducts of adequate length to be formed. It might be thought simpler to thicken the casting all the way round the pan at the Y-junction, but this has practical difficulties, at least in cast aluminium. Such a thickened portion takes longer to cool than other parts and sets up a distortion tending to bow the trough inwards. This makes release from the mould very difficult if not impossible. The relatively small fillets 7 do not give this problem.

Normally when cooking in oil and especially before the pan is charged with food, the liquid surface will be at or below duct level and liquid will not penetrate into the trough. But, should the oil boil up bubbles will form, and these will attempt to work their way up through the ducts 8. However, this movement is blocked, provided the ducts are of small diameter, of the order of 2–3 mm, and have a length substantially greater than their diameter, of the order of 8–20 mm. Satisfactory examples have been found to be 2 mm×8 mm, 3 mm×12 mm and 3 mm×19 mm. In more detail, the bubbles are restricted in size and are, in effect, squeezed by the ducts. This accentuates the friction exerted by the duct walls on the film defining the bubbles, and this is sufficient for them to become stuck and to resist the pressure of further bubbles trying to escape via the ducts. However, should any fat or oil spill over into the trough, then it will be cooled to a certain extent, since the trough is more remote from the heat source than the main part of the pan. It will revert to its liquid, non-bubbled state, and then, by virtue of its increased density, will be able to flow back down the ducts 8, pushing any stuck bubbles before it. Thus, in effect, the ducts 8 are one-way valves without any moving parts beyond the liquid whose flow is being controlled.

The ducts will generally be formed by drilling, as mentioned above, and so will be straight cylindrical passages, possibly with a slightly funnelled mouth at least at the upper end as shown. This has been found to be quite satisfactory. However, it would be even better to have the ducts with a slight taper, narrower at the top than at the bottom, which would have no adverse effect on the return drainage function, but which would tend to be even more obstructive to the bubbles of fat which get stuck in the ducts. This is indicated by broken lines in FIG. 1, much exaggerated.

Figure 2:
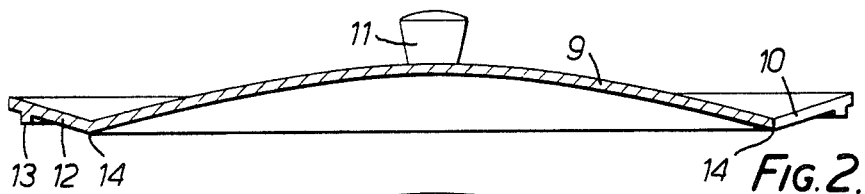
FIG. 2 is a cross-section of a lid for the pan of FIG. 1.
Figure 3:
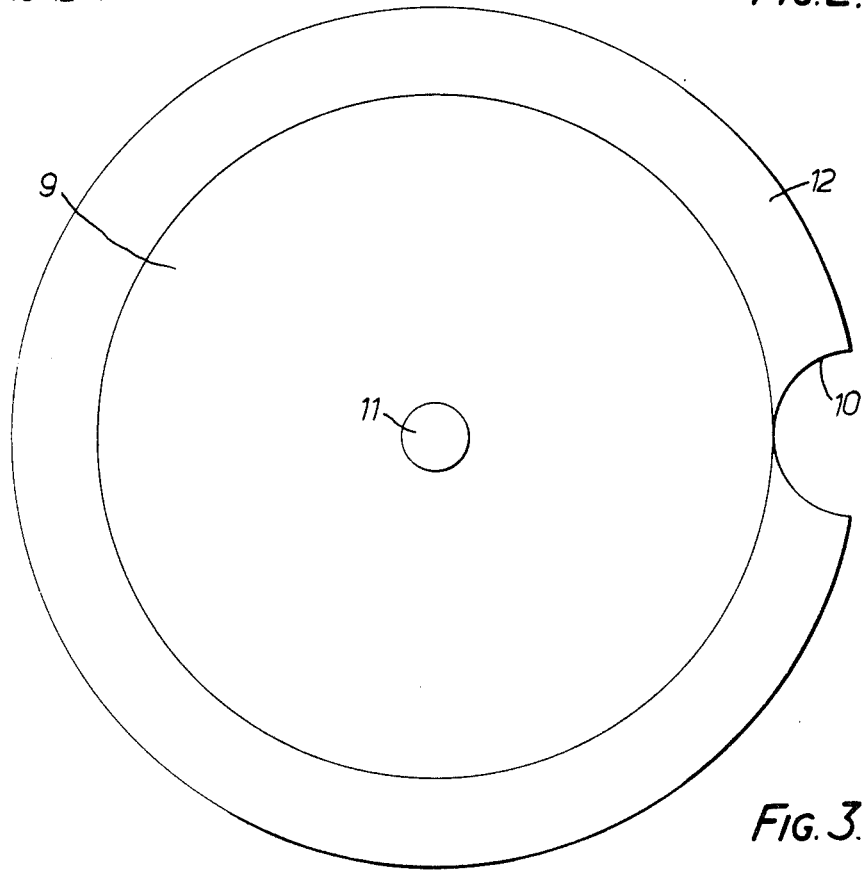
FIG. 3 is a plan view of the lid.

The pan has a lid 9 as shown in FIGS. 2 and 3 which fits to the outer portion 5 and thereby covers the entire pan. The lid has a vent for steam in the form of a cut-out 10 from its edge. There could be more than one vent and each could have a shutter to adjust the aperture. The lid 9 is of domed form with a central knob 11 for handling. However, the dome is not continuous to the extreme edge; at a radius over the trough 6 the slope reverses and an edge portion 12 inclines upwardly and outwardly. It has an annular rib 13 on its underside to locate the lid on the rim of outer portion 5. The cut-out 10 is entirely in this outer edge portion, as would any alternative or additional vents be.

As well as conserving heat and providing protection, the lid operates as a water eliminator. When the pan is charged with food of high water content, such as potato chips, a considerable amount of steam is generated. Much of this will escape through the vent 10, but a certain amount will condense out on the underside of the lid. Because of the domed configuration, this condensate will work its way downwards and outwards to the annular node 14 formed by the reversal of slope. It will not be able to climb up the outer portion 12, and so it has eventually to drop off into the trough 5. If there is boiling fat in the pan, the bottom of the trough will be well above 100° C., and so the drops of condensate will immediately re-vapourise, to escape via the vent 10. Should any condensate manage to collect in the trough, it will not return to the main body of the pan via the ducts 8. It will only be very shallow and therefore have negligible head. This, coupled with its natural disaffinity for oil or fat, means that the bubbles in the ducts will provide an effectively impenetrable barrier.

Thus the lid and the trough prevent water droplets returning to the main body of the pan, where there would be continuous explosive re-vapourisation as they hit the fat. Instead, the water is led safely away and vented.

The pan may be used for cooking or heating other liquids than oil. For example, the design would serve well for a milk pan, recovering and returning the boiled-over milk, although more and larger ducts 8 will generally be necessary. A diameter up to 7 mm and a length up to 25 mm may be acceptable, and a suitable practical example is 6 mm×22 mm.

Another use for the pan is as a steamer. The lid 9 would be used, with the vent 10 closed entirely or partially. A wire basket as indicated in outline by 15 in FIG. 1 will be suspended from the rim of the inner portion 4, and in use will be charged with the food to be cooked. Water in the base of the pan will be boiled, and the steam will percolate up through the basket and its contents. It will condense out in the lid and run down to the annular node 13, whence it will drop back into the trough 6. This will not be at such a high temperature as when cooking with fat, and the water will not re-vapourise there. Instead, it will trickle back into the base of the pan via the ducts 7. Thus, the condensate is directed clear of the food, which will not become soggy with the drips.

Such a basket can of course also be used to hold food to be cooked in oil or liquid fat, but it will be preferred then to use a deeper one which will sit on the base of the pan and not be suspended. Also it will preferably have a handle which can project through the vent 10.

We claim:

1. A cooking pan comprising an integrally formed structure having a base and a wall upstanding from the periphery of the base and dividing around the rim to form an overspill trough, there being small bore ducting of a diameter in the range 2-7 mm and 8 to 25 mm in length formed within the thickness of the wall leading down from the base of the trough to open into the interior of the pan, said small bore ducting being entirely surrounded by said wall and tapering, being wider at the lower end than at the upper.

2. A cooking pan according to claim 1, wherein the structure is cast metal.

3. A cooking pan according to claim 1, wherein the structure is moulded ceramics or glass.

4. A cooking pan according to claim 1, wherein each duct is a drilling of the order of 8-20 mm in length and 2-3 mm in diameter.

5. A cooking pan according to claim 4, and further comprising a basket adapted to be suspended within the pan from the inner rim of the trough.

6. A cooking pan according to claim 1, wherein the wall divides with an inner portion continuing up from the single part and an outer portion projecting outwardly and then upwardly to a rim height greater than that of the inner portion.

7. A cooking pan according to claim 6, wherein, at the junction of the inner and outer portions, the single part of the wall is locally thickened externally in the form of circumferentially spaced fillets, the ducting being formed in a selection of such fillets.

8. A cooking pan according to claim 1, and further comprising a lid, the lid having a domed central portion which will clear the inner rim of the trough and an upwardly and outwardly inclined outer edge portion, which will locate on the outer rim of the trough, these portions merging at an annular node overlying the trough.

9. A cooking pan according to claim 8, wherein venting means are provided in the outer edge portion.